United States Patent [19]

DeBeuckelaer et al.

[11] 4,279,757
[45] Jul. 21, 1981

[54] PROCESS FOR SEPARATING HYDROPHOBIC ORGANIC LIQUIDS FROM WATER

[75] Inventors: Gerard DeBeuckelaer, Weisenheim; Wolfgang Jarre, Ludwigshafen; Rolf Würmb, Heidelberg; Matthias Marx, Bad Durkheim, all of Fed. Rep. of Germany

[73] Assignee: BASF Aktiengesellschaft, Fed. Rep. of Germany

[21] Appl. No.: 108,424

[22] Filed: Dec. 31, 1979

[30] Foreign Application Priority Data

Jan. 15, 1979 [DE] Fed. Rep. of Germany ....... 2901335

[51] Int. Cl.$^3$ ............................................... C02F 1/28
[52] U.S. Cl. ..................................... 210/671; 210/693
[58] Field of Search ........ 210/30 A, 36, 40, DIG. 26, 210/671, 680, 693, 924; 521/164, 170; 528/75

[56] References Cited

U.S. PATENT DOCUMENTS

| | | | |
|---|---|---|---|
| 3,617,551 | 11/1971 | Johnston et al. | 210/30 A |
| 3,714,110 | 1/1973 | Verdol et al. | 528/75 |

OTHER PUBLICATIONS

PCT Publication, EP-933, Mar. 1979.

*Primary Examiner*—Ivars C. Cintins
*Attorney, Agent, or Firm*—David L. Hedden; Joseph D. Michaels

[57] ABSTRACT

A process for separating hydrophobic organic liquids from water comprising passing a mixture of water and hydrophobic organic liquids through a column-like vessel which is filled with a hydrophobic, preferably open-celled, polyurethane foam, said foam having a high absorption capacity, permits high flow-through velocities even as the foam becomes covered and saturated with the hydrophobic organic liquids, is reversibly deformable, and can be reused.

5 Claims, No Drawings

PROCESS FOR SEPARATING HYDROPHOBIC ORGANIC LIQUIDS FROM WATER

BACKGROUND OF THE INVENTION

1. Field of the Invention

The invention relates to a process for separating hydrophobic organic liquids, such as oil, from water. A mixture of water and hydrophobic organic liquids is placed in a column-like vessel which has been loosely filled with a hydrophobic, preferably open-celled, polyurethane foam. The water will flow through the foam material, but the hydrophobic organic liquid will be absorbed by it. When the foam becomes covered and saturated with the hydrophobic organic liquids, it is pressed to extract the hydrophobic organic liquid so that it can be reused.

2. Description of the Prior Art

The extraction of hydrophobic organic liquids from water, such as the extraction of crude oil from water, is very important to the preservation of the environment. Water in the environment may become contaminated with hydrophobic organic liquids as the result of accidents at sea, and when oil-containing ballast water is pumped from oil tankers.

The traditional methods used to separate hydrophobic organic liquids from water involve mechanical means based upon gravitational separation. The problem with these methods is that they require a large amount of time and space.

The prior art teaches that open-celled foams of polyurethane, urea formaldehyde condensates, polystyrene, cellulose, acetate, and other materials can be used to absorb oil from water surfaces. U.S. Pat. No. 3,779,908 teaches that flexible open-celled foam can be used to separate oil from water. The mixture of oil and water is allowed to flow through the foam where it is absorbed. Moreover, U.S. Pat. No. 3,886,067 teaches that oleophilic semi-rigid to rigid foams can be distributed on oil-containing water surfaces to absorb oil. The foams are then removed after absorption. The problem with the foams disclosed in these and similar patents is that they only had slight oil absorption capacities.

U.S. Pat. No. 3,681,237 teaches that the oil absorption capacity of foams can be increased if they are coated with hydrophobic agents. The coatings, however, are washed away relatively quickly and, thereby, rendered ineffective. German Patent Application No. P 2738268.9 teaches that hydrophobic compounds can be incorporated into the structure of the foam in order to increase the oil absorption capacity of the foam. Lipophilic compounds are used as the hydrophobic compound. The density of the foam produced is from 8 to 25 grams per liter and the ratio of closed to open cells is from 3:30 percent to 97:70 percent. Because the foams have such low densities, they are reversibly deformable only on a limited scale. Consequently, they can be pressed out and reused only on a limited basis resulting in higher costs.

Another major problem with the foams disclosed in the prior art is that they permit a low rate of flow-through and quickly become plugged by the oil or other hydrophobic liquids. Such high flow-through velocities are needed for practical usage, especially for pumping out ballast water and removing oil spills, methods had to be found to eliminate this problem.

DESCRIPTION OF THE PREFERRED EMBODIMENT

The problems involved in separating hydrophobic organic liquids from water were solved by utilizing a process comprising loosely filling a vessel with polyurethane foam so that the foam will represent from 50-95 percent of the total volume when the vessel is filled, and passing a mixture of water and organic hydrophobic liquids through the vessel, said foam being a hydrophobic, preferably open-celled, polyurethane foam which (a) contains in bonded form, a compound (1) whose percent by weight, relative to the total weight of the polyisocyanate and polyol being reacted, is from 2 to 50 percent; (2) which has a hydrophobic effect; (3) which contains at least one group having a Zerewitinoff active hydrogen atom; and (4) which has a solubility parameter of 7.5 to 10.5 $(cal/cm^3)^{\frac{1}{2}}$;

(b) is reversibly deformable; and (c) is compressed less than 25 percent by its own weight and the weight of the mixture containing water and hydrophobic organic liquids when the foam is loaded with said mixture.

After the foam material in the column-like vessel becomes covered and saturated with the hydrophobic organic liquids, the foam is then pressed to extract the hydrophobic organic liquids so that it can be reused.

The details of the various steps involved in this process will now be described.

A. PREPARING THE FOAM MATERIAL

The foam material is essentially made by reacting polyisocyanates, polyols, and the hydrophobic compound. Blowing agents, chain extenders, auxiliaries, and additives can also be used to obtain the desired results. Detailed explanations of the chemistry involved in the manufacture of polyurethane foams from polyisocyanates and polyhydroxyl compounds, and the use of chain extenders, auxiliaries and additives are well known in many patents and publications. [See the publications by J. H. Saunders and K. C. Frisch, *High Polymers*, Volume XVI, "Polyurethanes", Part I and II (Interscience Publishers, New York); R. Vieweg and J. A. Hoechtlen, *Plastics Handbook*, Volume VII, "Polyurethane", (Carl Hanser Publishers, Munich).]

Possible organic polyisocyanates which can be used in the preparation of the foam include aliphatic, cycloaliphatic and, preferably aromatic, di- and polyisocyanates. Aliphatic diisocyanates such as 1,6-hexane diisocyanate, 1,10-decane diisocyanate and 1,12-dodecane diisocyanate; and cycloaliphatic diisocyanates such as 1,4-cyclohexane diisocyanate, isophorone diisocyanate and dicyclohexylmethane diisocyanate can be used. Preferably used are aromatic di- and polyisocyanates such as 2,4- and 2,6-toluene diisocyanates, as well as their commercially available isomer mixtures; 2,4'-, 4,4'- and 2,2'-diphenylmethane diisocyanates and their isomer mixtures; mixtures of toluene diisocyanates and diphenylmethane diisocyanate isomer mixtures; and mixtures of the following: (1) toluene diisocyanates, (2) mixtures of diphenylmethane diisocyanates, and (3) polyphenyl polymethylene polyisocyanates (crude MDI). Preferably used, however, are technical mixtures of diphenylmethane diisocyanates and polyphenyl polymethylene polyisocyanates (crude MDI) and in particular those having a diphenylmethane diisocyanate isomer content of 40 to 95 percent by weight and mixtures of toluene diisocyanates and crude MDI.

Polyols which can be used in the preparation of the foam material are polyester polyols and polyether polyols having a functionality of 2 to 3.5 and molecular weights of 400 to 7500, preferably of 2000 to 4500. However, it is also possible to use other hydroxyl group-containing polymers with the stated functionalities and molecular weights, for instance, polycarbonates (particularly those produced from diphenyl carbonates and 1,6-hexanediol by transesterification), polyoxymethylene, and polyester amides.

Suitable polyester polyols may, for instance, be produced from the reaction of dicarboxylic acids, preferably aliphatic dicarboxylic acids, having 2 to 12, preferably 4 to 8, carbon atoms in the alkylene radical, and multivalent alcohols, preferably diols. Examples include aliphatic dicarboxylic acids such as glutaric acid, pimelic acid, suberic acid, azelaic acid, sebacic acid, undecane dioic acid, dodecane dioic acid and, preferably succinic and adipic acids, and aromatic dicarboxylic acids such as phthalic acid and terephthalic acid. Under certain circumstances, it may also be appropriate to use small quantities of long-chained monofunctional carboxylic acids such as oleic acid or 2-ethylhexoic acid. Examples of bi- and multifunctional, particularly trifunctional, alcohols are ethylene glycol, diethylene glycol, 1,2-propylene glycol, trimethylene glycol, dipropylene glycol, 1,10-decanediol, glycerine, trimethylolpropane, pentaerythritol, and preferably 1,4-butanediol and 1,6-hexanediol. Multifunctional and, in particular trifunctional, alcohols are used in the manufacture of the primarily linear polyester polyols. Their content must be calculated in such a manner that the functionality of the resulting polyester polyols is 3.5 maximum and the OH number is preferably smaller than 200.

Preferably used as polyols, however, are polyether polyols which are produced according to familiar methods from one or more alkylene oxides having 2 to 4 carbon atoms in the alkylene radical and a starter molecule containing 2 to 4, preferably 3, active hydrogen atoms. Suitable alkylene oxides include 1,2- or 2,3-butylene oxide, styrene oxide, and preferably ethylene oxide and propylene oxide. The alkylene oxides may be used individually, alternatingly in sequence, or as mixtures. Tetrahydrofuran and 1,3-epoxypropane may also be used to react with the starter compounds. Possible starter compounds include water, dicarboxylic acids such as succinic acid, adipic acid, phthalic acid and terephthalic acid; unsubstituted and N,N'-dialkyl substituted diamines having 1 to 4 carbon atoms in the alkyl radical such as unsubstituted and dialkyl-substituted ethylene diamines, 1,2- or 1,3-propylene diamine, 1,4-butylene diamine, 1,6-hexamethylene diamine, 4,4'-, 2,4'- and 2,2'-diaminodiphenylmethane as well as N-alkyl-diethanolamines, trialkanolamines, and preferably multifunctional, particularly bi- and trifunctional, alcohols such as ethylene glycol, propylene glycol, diethylene glycol, dipropylene glycol, 1,4-butanediol, 1,6-hexanediol, glycerine, trimethylolpropane and pentaerythritol.

Trifunctional polyether polyols having molecular weights of 400 to 7500, preferably of 2,000 to 4,500, and hydroxyl numbers of 20 to 200, preferably of 25 to 80, which contain ethylene oxide as well as propylene oxide units in the oxyalkylene chain are preferably used. These units can be arranged in the oxyalkylene chain either statistically or in block fashion. Particularly useful are those propylene oxide-ethylene oxide polyether polyols having an ethylene oxide content of less than 50 percent by weight, preferably less than 20 percent by weight, relative to the total weight of the mixture.

It may under certain circumstances be appropriate to use di- to tetrafunctional chain extenders or cross-linking agents in addition to the polyols. Possible chain extenders are aliphatic diols with 2 to 6 carbon atoms such as ethylene glycol, 1,4-butanediol, 1,6-hexamethylene glycol, dipropylene glycol, and dibutylene glycol and aromatic, aliphatic diols such as di(beta-hydroxyethyl)-hydroquinone. In order to increase the rigidity of the foam, tri- to tetrafunctional alcohols with OH numbers from 200 to 800 such as glycerine, trimethylolpropane, pentaerythritol, and reaction products of alkylene oxides with ethylene diamines, as well as ethylene diamine, may also be used as cross-linking agents. Mixtures of polyols and chain extenders or cross-linking agents in a weight ratio of 60:40 to 98:2, preferably 85:15 to 97:3, have proven to work well.

Compounds having a hydrophobic effect which can be used in the preparation of the foam materials are oleophilic compounds with solubility parameters of 7.5 to 10.5 $(cal/cm^3)^{\frac{1}{2}}$, preferably of 8.5 to 10 $(cal/cm^3)^{\frac{1}{2}}$, which have at least one group having a Zerewitinoff active hydrogen atom, for instance, a —SH, —NH, —COOH and preferably —$NH_2$ and —OH group and which are thus incorporated into the structure of the polyurethane foam. Examples include substituted, saturated and unsaturated aliphatic fatty acids with 10 to 25, preferably 10 to 20, carbon atoms in the molecule as well as their derivatives, preferably their esters; diols and triols having 2 to 20 carbon atoms in the alcohol radical; and amides. Specifically included are: fatty acids such as capric acid lauric acid, myristic acid, palmitic acid, stearic acid, arachic acid, lignoceric acid, palmitoleic acid, oleic acid, resinoleic acid, linoleic acid and linolenic acid; fatty esters such as castor oil, tall oil, adducts of the above fatty acids and propylene and/or ethylene oxide; multifunctional alcohols such as ethylene glycol, 1,4-butanediol, 1,6-hexanediol and glycerine; and fatty acid amides with mono- and dialkanolamines such as oleic mono- and diethanol amide, resinoleic mono- and diethanol amide, as well as their N,N-dialkyl amides such as resinoleic dimethylaminopropyl amides. Alkylene oxide addition products to fatty esters and amides also result in substances which impart hydrophobic effects to the foams.

Another class of compounds having a hydrophobic effect is butadiene oligomers having molecular weights of 500 to 10000, preferably 1,500 to 3,500, and having at least one functional group which reacts with NCO groups. Particularly preferred are especially the oleic diethanol amides and a polybutadiene diol having a molecular weight of approximately 2500.

The compounds having a hydrophobic effect are used in quantities of 2 to 50 percent by weight, preferably of 10 to 30 percent by weight relative to the total weight of the polyisocyanates and polyols.

Water which reacts with isocyanate groups by forming carbon dioxide is used as blowing agent. Preferably used are 0.5 to 5 percent by weight, particularly 1.5 to 3.5 percent by weight, of water relative to the weight of the polyol. Instead of water alone, mixtures of water and chemically inert, low-boiling hydrocarbons may also be used as blowing agents. Taken into consideration, for instance, are hydrocarbons with boiling points below 50° C., preferably between −50° C. and +30° C., under atmospheric pressure. To be mentioned in detail are, for instance, halogenated hydrocarbons such as monochlorodifluoromethane, dichloromonofluoromethane, dichlorodifluoromethane, and trichlorofluoromethane and their mixtures, and hydrocarbons such as propane and isobutane as well as dimethyl ether. Suitable mixtures of water and halogenated hydrocarbons generally consist of 5 to 10 percent by weight, preferably 10 to 50 percent by weight, of water, and 30 to 95 percent by weight, preferably 50 to 90 percent by weight, of halogenated hydrocarbons with the percentages by weight being relative to the total weight of the blowing agent mixture. The required quantities of blowing agent mixture can be determined by a simple experiment. These quantities are a function of the mixing ratio of water to hydrocarbon blowing agent as well as the desired foam density. The blowing agent mixture amounts to approximately 2 to 40, preferably 5 to 25, percent by weight relative to the polyol weight.

It is also possible to incorporate catalysts which accelerate the polyurethane formation and possibly additives which are normally used for the manufacture of polyurethane foams in the foamable reaction mixture. Typical examples include surface-active substances, pore regulating agents, antioxidants, hydrolysis protection agents, dyes, fillers, and other additives.

Suitable catalysts for accelerating the reaction between polyols, water, possible chain extenders and the polyisocyanates include tertiary amines such as dimethylbenzyl amine, N,N,N',N'-tetramethyldiaminoethyl ether, bis-(dimethylaminopropyl)-urea, N-methyl- or N-ethylmorpholine, dimethyl piperazine, 1,2-dimethylimidazole, 1-aza-bicyclo-(3,3,0)-octane and preferably triethylene diamine; metal salts such as tin dioctoate, lead octoate, tin diethylhexoate and preferably tin-(II)-salts and dibutyltindilaurate as well as, particularly, mixtures of tertiary amines and organic tin salts. Preferably used are 0.5 to 5 percent by weight of catalyst based on tertiary amines, and/or 0.05 to 2.5 percent by weight of metal salts, the weight being relative to the polyol weight.

Surface-active substances, which support the homogenization of the raw materials and are possibly also suited to regulate the cell structure of the polyurethane flexible foams, may also be used in preparing the foam materials. These include, for instance, siloxane, oxyalkylene mixed polymerizates, and other organo polysiloxanes. Oxyethylated alkyl phenols, oxyethylated fatty alcohols, paraffin oils, castor oil or resinoleic ester, and Turkish red oil can also be used. These substances are used in quantities of 0.2 to 6 parts by weight per 100 parts by weight of polyisocyanate mixture.

The hydrophobic, preferably open-celled, reversibly deformable polyurethane foams may be prepared according to the prepolymer and preferably according to the one-shot process. If the foams are manufactured according to the one-shot process, a mixture of polyol, the compounds having the hydrophobic effect, water, catalyst, and possibly chain extenders and additives are reacted with the polyisocyanates at temperatures from 15° to 60° C., preferably from 25° to 40° C. The quantities of the reactants are such that the ratio of hydroxyl groups of the polyols and possibly the chain extenders or cross-linking agents, as well as the Zerewitinoff active hydrogen atoms of the compound having a hydrophobic effect, to the NCO groups of the polyisocyanates is 0.1:1 to 0.4:1, and such that the ratio of all reactive hydrogen atoms bonded to polyol, additives having a hydrophobic effect, water and possibly chain extenders or cross-linking agents, to NCO groups is approximately 0.7:1 to 1.3:1 and preferably 0.9:1 to 1.1:1. Using a mixing chamber with several feed nozzles, the liquid raw materials may be introduced individually or, if the components are solid, in the form of solutions or suspensions and may be mixed intensively in the mixing chamber. However, it has proven to be particularly useful to work according to the component method and to combine the mixture of polyols, the compound having a hydrophobic effect, water, catalyst, possibly the chain extender and additives to component A and to use the polyisocyanate mixture according to this invention as component B.

In order to produce the NCO group-containing prepolymers, the polyisocyanates are reacted with the above-mentioned polyols and/or chain extenders or cross-linking agents in such quantities that the ratio of NCO groups to total hydroxyl is 5:1 to 95:1, preferably 10:1 to 90:1. The resulting prepolymers are subsequently mixed with compounds having a hydrophobic effect, water or mixtures of water and low-boiling, halogenated hydrocarbons and additional polyols and/or chain extenders and additives, and the mixture is allowed to foam.

The resulting hydrophobic polyurethane foams have densities of 15 to 200 grams per liter, preferably of 30 to 60 grams per liter, and are preferably open-celled and therefore reversibly deformable. However, a basic prerequisite for their possible application for separating hydrophobic liquids from water is that the polyurethane foams and/or the polyurethane foam particles produced therefrom, are compressed less than 25 percent, preferably 5 to a maximum of 20 percent, when subjected to the weight of the mixture of hydrophobic organic liquids and water in the column-like vessel. If the foams are compressed to a greater extent, it may happen that the absorbed hydrophobic liquids are pressed out by the weight of the loaded foam particles and the water column.

B. PROCESSING THE FOAM MATERIALS

The hydrophobic polyurethane foam may be processed into polyurethane foam particles by means of punching, milling, sawing, or cutting. Such polyurethane foam particles may also be produced by direct molding. The polyurethane foam particles may be spheres, cylinders, cones, rings or tablets or mixtures of the referenced shapes. Preferably used are spheres and cylinders. In the case of spherical foam particles, these spheres generally have a diameter of 5 to 200, preferably of 10 to 100, millimeters. Cylindrical filler materials generally have a length of 10 to 200 millimeters and a diameter of 5 to 200 millimeters. Non-spherical fillings generally have a volume which corresponds approximately with that of the cylindrical foam particles.

C. FILLING THE COLUMN-LIKE REACTION VESSEL WITH FOAM MATERIAL

After the polyurethane foam materials are shaped, they are introduced into column-like vessels, the cross section of which may have a random shape such as a square, a rectangle, a prism, an elipse or, particularly, a circle. Preferably used, however, are long cylindrical vessels which have a ratio of the internal diameter to lengths of approximately 1:0.5 to 1:10, preferably 1:1 to 1:6, and which are vertically arranged. In order to obtain high flow-through velocities and avoid plugging, it is of great importance to the invention that the column-like vessels are filled loosely or stacked, depending upon their shape, with the polyurethane foam particles in such a manner that 50 to 95 volume percent, preferably 70 to 90 volume percent, relative to the total volume of the vessel, consist of polyurethane foam particles when the vessel is filled. In other words, the vessel is packed in such a manner that the ratio of volume parts of polyurethane foam particles to empty volume per volume unit is 1:1 to 95:5, preferably 7:1 to 9:1.

D. FILLING THE REACTION VESSEL WITH THE MIXTURE OF WATER AND HYDROPHOBIC ORGANIC LIQUIDS AND PRESSING THE FOAM FOR REUSAGE

After the reaction vessel is loosely filled with foam, it is then filled from the top with the mixture of water and the hydrophobic organic liquid. The flow-through velocity is a function of the degree to which the polyurethane foam materials are covered with hydrophobic organic liquid; and is an average of 5 to 300 cubic meters per square meter per hour, preferably 20 to 100 cubic meters per square meter per hour. As soon as the polyurethane foam particles have reached a degree of saturation of approximately 60 to 90 percent, preferably 70 to 80 percent, the feed of polluted water is stopped, the reaction vessel is allowed to empty and the polyurethane foam particles are subsequently pressed out for reusage. The polyurethane foam particles can be pressed out several times, for instance, 10 to 1000 and particularly 50 to 200 times and then can be used again as absorption material. In order to make possible a cyclic pressing of the polyurethane foam particles loaded with the hydrophobic liquid, it is appropriate that the reaction vessel be equipped with a suitable pressing device.

The parts referred to in the Examples are relative to weight. Volume parts are to weight parts as kilograms are to meters.

EXAMPLE 1

A. Manufacture of Polyurethane Foam 15 parts of oleic diethanol amide,
85 parts of a trifunctional polyether polyol based on glycerine, propylene oxide and ethylene oxide having a hydroxyl number of approximately 35,
4 parts of a tetrafunctional polyether polyol based on ethylene diamine-propylene oxide having a hydroxyl number of approximately 480,
2.7 parts of water,
0.2 part of bis-[2-(N,N-dimethylamino)ethyl]-ether,
0.1 part of triethylene diamine,
1 part of a polyether silicon-block polymeric (Tegostab ®B 4690), and
0.05 part of dibutyltin dilaurate
are intensively mixed and are reacted at 25° C. with 42.85 parts of a mixture consisting of 2,4- and 2,6-toluene diisocyanate (isomer ratio 80:20) and crude MDI in a weight ratio of 80:20.

The foamable reaction mixture is allowed to complete the reaction in a closed mold. The result is a reversibly deformable polyurethane foam having a density of 50 grams per liter which is processed into cylindrical shapes having a diameter of 1 centimeter and a height of 1 centimeter.

B. Filling the Reaction Vessel

Into a vertical packed column having a diameter of 10 centimeters and a height of 60 centimeters, a hydrophobic polyurethane foam cylinder, in compact form, having the diameter of the packed column and a height of 15 centimeters (weight: 55 grams), is initially inserted as the bottom filling. The remaining 45 centimeters to the total height of 60 centimeters of the packed column are loosely fitted with 130 grams of the above-described cylindrical polyurethane foam particles. The ratio of the volume filled with polyurethane foam particles to empty volume was approximately 80:20.

The packed column was fed with a mixture of 95 parts by weight of water and 5 parts by weight of a crude oil, which was free of gasoline hydrocarbons (viscosity: 550 cPs at 22° C. and density: 0.89 grams per cubic centimeter), by means of a rotary pump. The flow-through velocity was determined for a test period of 15 minutes.

Subsequently, the polyurethane foam was pressed out and again used as filter material. This process was repeated ten times and the average oil absorption was determined.

EXAMPLE 2

The procedure described in Example 1 was followed using the hydrophobic polyurethane foam prepared from the following ingredients:
30 parts of a polybutadiene diol (equivalent weight 1250, Polybd ®R-45 M),
70 parts of a polyether polyol based on glycerine, ethylene oxide, and propylene oxide having a hydroxyl number of 28,
3 parts of water,
0.2 part of an amine catalyst (Desmorapid ®PV),
0.1 part of triethylene diamine,
0.8 part of a polyether-polysiloxane block polymeric (Tegostab B 4690), and
40 parts of a mixture of 2,4- and 2,6-toluene diisocyanates (isomer ratio 80:20) and crude MDI in a weight ratio of 70:30.

COMPARISON EXAMPLE

The packed column referred to in the preceding examples, having a diameter of 10 centimeters and a height of 60 centimeters, is filled in a compact manner with 155 grams of a commercially available flexible polyurethane block foam. Said foam has a density of 33 grams per liter and is in the form of cylindrical segments having a diameter of 10 centimeters and a height of 2 centimeters so that the volume of the packed column was 100 percent filled with polyurethane foam.

The packed column was fed with the oil-water mixture described under Example 1 by the same method that was used in Examples 1 and 2. The results of Examples 1 and 2 and the Comparison Example are combined in the following table.

| Example | 1 | 2 | Comparison Example |
|---|---|---|---|
| Foam Type | Hydrophobic Polyurethane Foam | Hydrophobic Polyurethane Foam | Commercially Available Polyurethane Block Foam |
| Density | 50 g/l | 45 g/l | 33 g/l |
| Foam quantity | 185 g | 165 g | 155 g |
| Percentage of the Polyurethane Foam Volume of the Entire Bed Volume | 80% | 80% | 100% |
| Flow-through | | | |

-continued

| Example | 1 | 2 | Comparison Example |
| --- | --- | --- | --- |
| Velocity After | | | |
| 2 minutes | 170 l/h | 180 l/h | 70 l/h |
| 3 minutes | 130 l/h | 150 l/h | 40 l/h |
| 5 minutes | 100 l/h | 100 l/h | 30 l/h |
| 7 minutes | 90 l/h | 80 l/h | 25 l/h |
| 10 minutes | 75 l/h | 70 l/h | 20 l/h |
| 15 minutes | 70 l/h | 70 l/h | 15 l/h |
| Average Oil Absorption | 1500 g | 1300 g | 380 g |

Examples 1 and 2 and the Comparison Example show that the process disclosed in this application, which makes use of the special hydrophobic polyurethane foams, results in a considerable increase in oil absorption capacity and flow-through velocity. These results are possible if the proper ratio of volume parts of polyurethane foam particles to empty volume of the overall volume is maintained.

The embodiments of this invention in which an exclusive privilege or property is claimed are defined as follows:

1. A process for separating hydrophobic organic liquids from water comprising loosely filling a vessel with polyurethane foam so that the foam will represent from 50–95 percent of the total volume when the vessel is filled, and passing a mixture of water and organic hydrophobic liquids through the vessel, said foam being a hydrophobic, polyurethane foam which
   (a) contains in bonded form, a compound (1) whose percent by weight, relative to the total weight of the polyisocyanate and polyol being reacted, is from 2 to 50 percent; (2) which has a hydrophobic effect; (3) which contains at least one group having a Zerewitinoff active hydrogen atom; and (4) which has a solubility parameter of 7.5 to 10.5 $(cal/cm^3)^{\frac{1}{2}}$;
   (b) is reversibly deformable; and
   (c) is compressed less than 25 percent by its own weight and the weight of the mixture containing water and hydrophobic organic liquids when the foam is loaded with said mixture.

2. The process of claim 1 comprising the additional step of pressing the foam to extract the hydrophobic liquids therefrom and reusing the foam according to the process of claim 1.

3. The process of claim 1 wherein the compound of claim 1, paragraph (a) is oleic diethanol amide.

4. The process of claim 1 wherein the compound of claim 1, paragraph (a) is polybutadiene diol.

5. The process of claim 1 wherein the hydrophobic polyurethane foams have densities of 30 grams to 200 grams.

* * * * *